R. C. JOHNSON & D. S. McEWING.
COMBINED CAR AND GRAIN DOOR.
APPLICATION FILED OCT. 28, 1909.
1,022,422.
Patented Apr. 9, 1912.
4 SHEETS—SHEET 1.
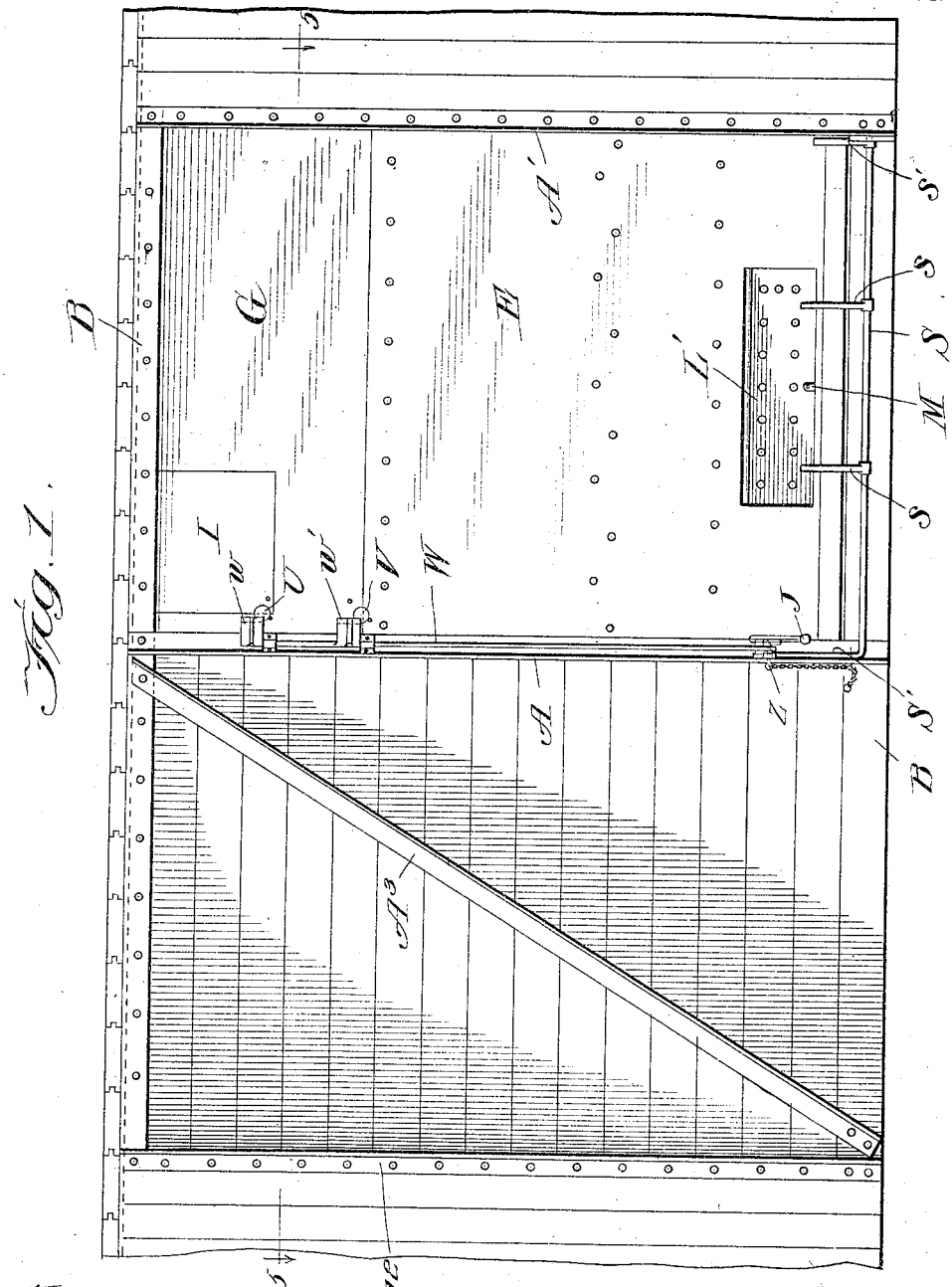

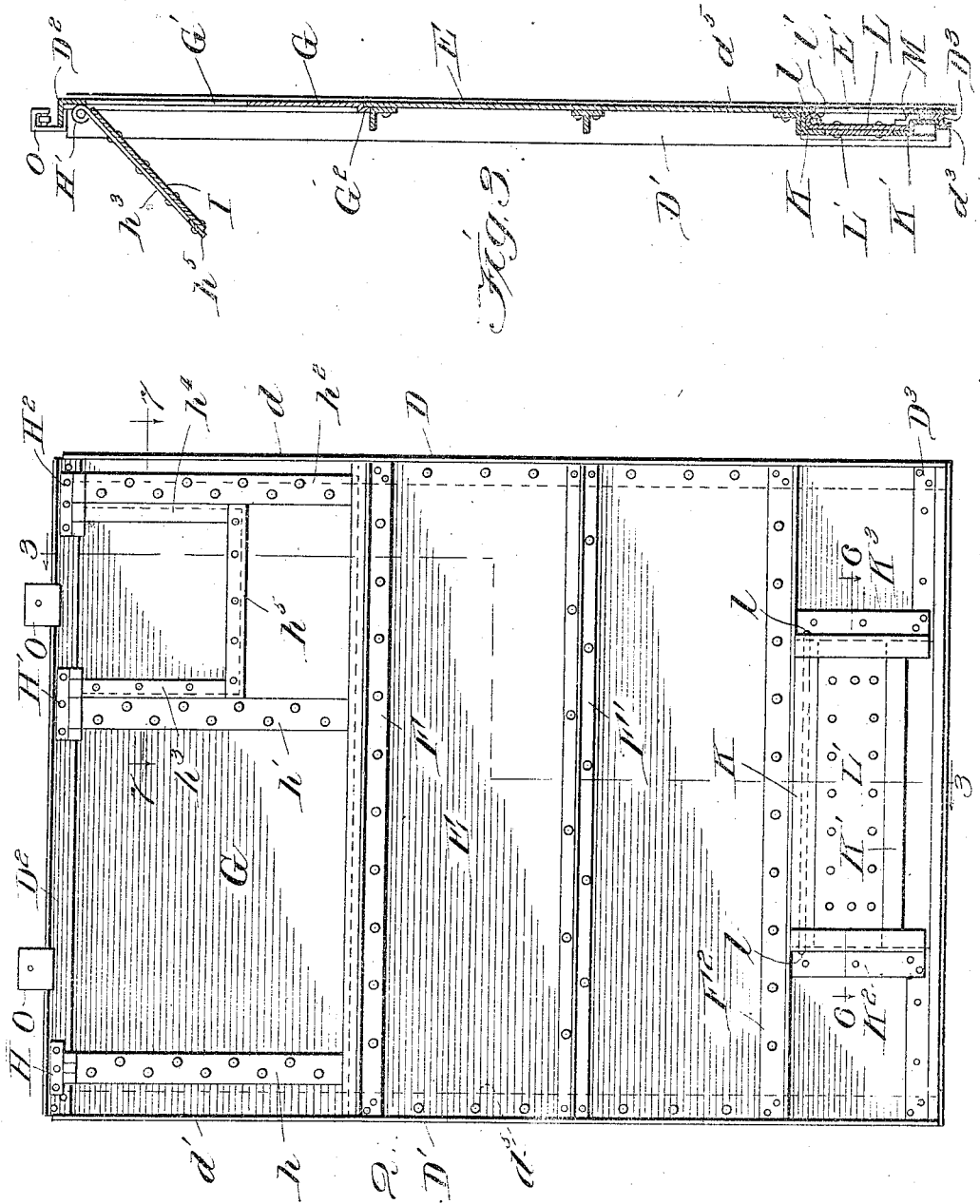

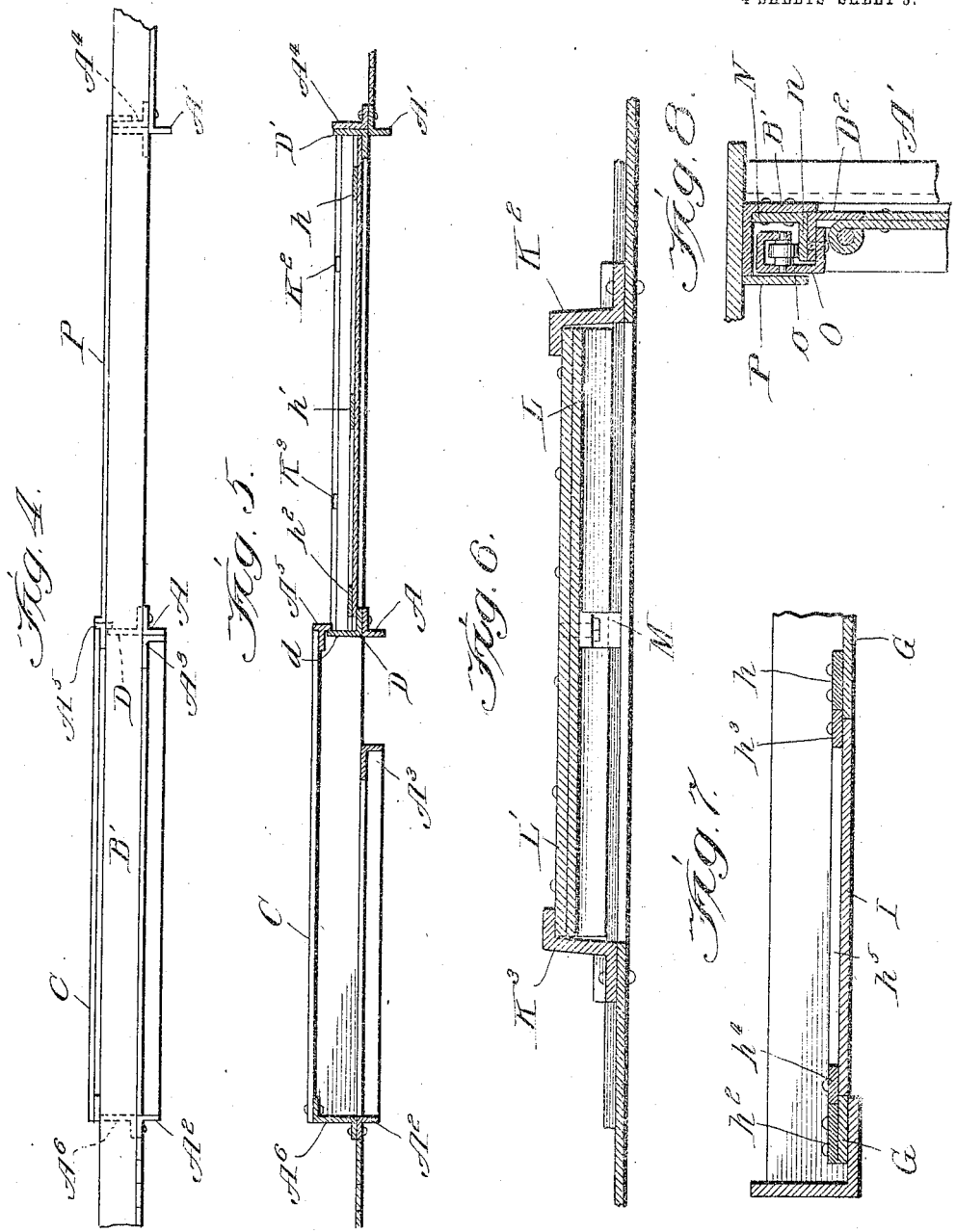

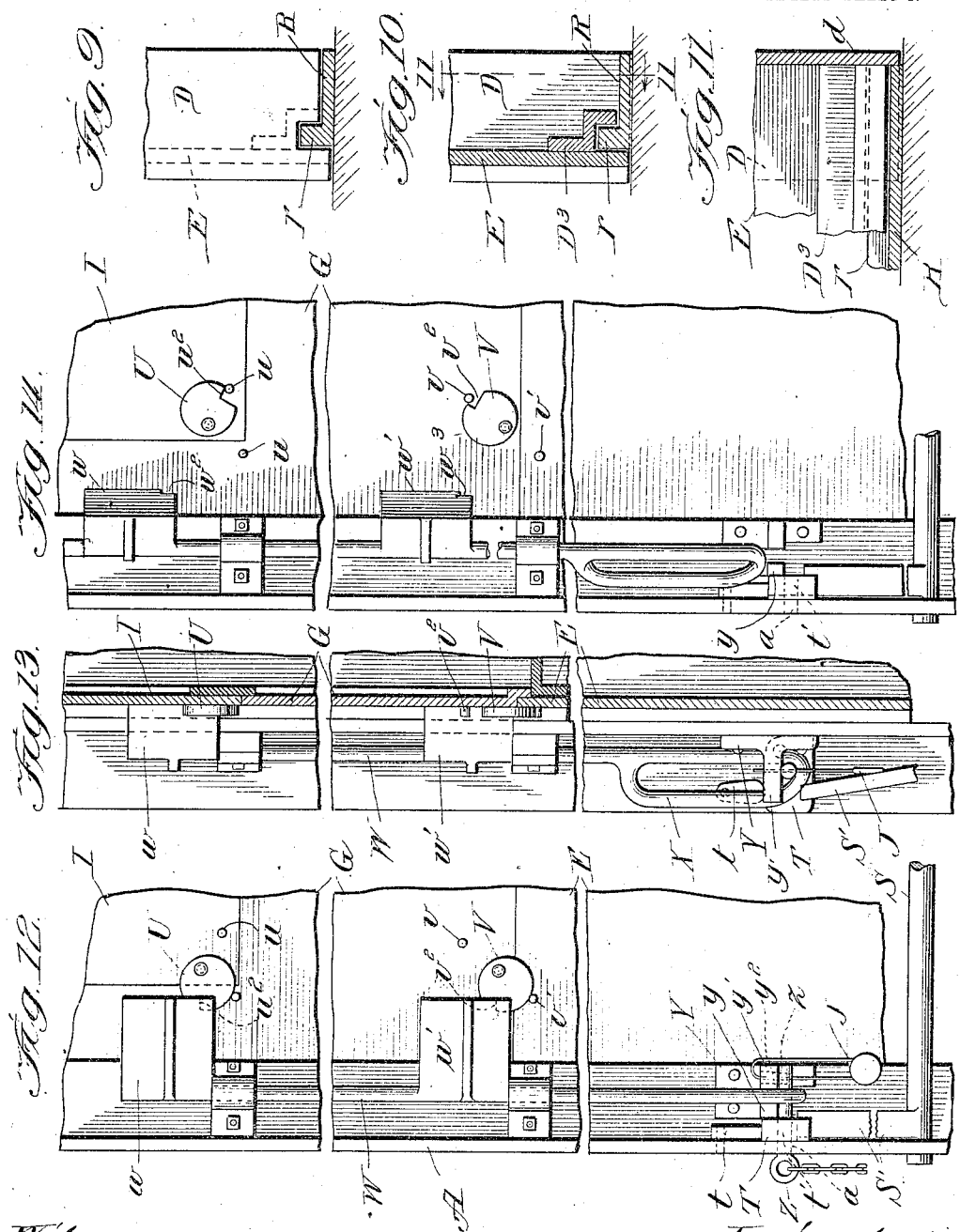

UNITED STATES PATENT OFFICE.

ROBERT C. JOHNSON AND DUNCAN S. McEWING, OF CHICAGO, ILLINOIS.

COMBINED CAR AND GRAIN DOOR.

1,022,422. Specification of Letters Patent. Patented Apr. 9, 1912.

Application filed October 28, 1909. Serial No. 525,048.

*To all whom it may concern:*

Be it known that we, ROBERT C. JOHNSON and DUNCAN S. MCEWING, citizens of the United States, residing at Chicago, county of Cook, State of Illinois, have invented a certain new and useful Improvement in Combined Car and Grain Doors, and declare the following to be a full, clear, and exact description of the same, such as will enable others skilled in the art to which it pertains to make and use the same, reference being had to the accompanying drawings, which form a part of this specification.

In shipping grain in bulk in freight cars it has heretofore been necessary to provide an auxiliary door within each of the main door openings in order to afford a sufficiently tight closure to prevent leakage of grain; the usual car door being inadequate to seal the door opening sufficiently. Another reason for the use of these auxiliary grain doors has been to permit a closure to be made across the lower half of the door opening, leaving the upper half uncovered so as to permit the grain to be introduced and removed through the main door opening.

The particular object of our invention is to provide a simple and novel construction and arrangement which will make it possible to use a single door which will serve both as a car door and as a grain door.

A further object of our invention is to provide a simple and novel arrangement for locking a combined car and grain door with a single lock or seal.

A further object of our invention is to provide a combined car and grain door which may be built up of structural iron or steel without requiring especial shapes.

A subsidiary object of our invention is to provide simple means for remodeling old cars so as to equip them with single doors which will serve as car and grain doors.

The various features of novelty whereby our invention is characterized will hereinafter be pointed out with particularity in the claims; but, for a full understanding of our invention and of its object and advantages, reference may be had to the following detailed description taken in connection with the accompanying drawings, wherein:

Figure 1 is the side of a fragment of a car equipped in accordance with the present invention; Fig. 2 is an inside view of the door; Fig. 3 is a section taken on line 3—3 of Fig. 2; Fig. 4 is a top plan view of the side of the car shown in Fig. 1, the roofing being omitted; Fig. 5 is a section taken on line 5—5 of Fig. 1; Fig. 6 is a section taken on line 6—6 of Fig. 2; Fig. 7 is a section taken on line 7—7 of Fig. 2; Fig. 8 is a section taken on line 8—8 of Fig. 4 showing, on an enlarged scale, a fragment directly under the roof of the car; Fig. 9 is an edge view of the lower portion of the door as viewed from the right in Fig. 1, the stationary guide for the lower part of the door being shown in section; Fig. 10 is a section taken near the opposite edge of the door from that shown in Fig. 9; Fig. 11 is a section taken on line 11—11 of Fig. 10; Fig. 12 is a view on an enlarged scale showing the locking means, parts being broken away; Fig. 13 is a view looking toward the left in Fig. 12; and Fig. 14 is a view similar to Fig. 12 showing the locking parts in different positions.

In the drawings we have illustrated our invention as applied to an ordinary wooden box car and, for the sake of brevity, we shall describe in detail only this arrangement; it being, of course, understood that the same construction may be embodied in cars of any type, particularly when it is placed in position at the time the cars are being built.

Referring to the drawings, A and $A^1$ represent door posts of angle iron. $A^2$ is another upright angle iron placed at one side of the door post A at a distance approximately equal to the width of the door opening. If desired, a diagonal strut $A^3$ may be arranged between the posts A and $A^2$.

B is the usual side sill of the car and $B^1$ is one of the longitudinal roof-supporting members at the top of the car, the latter member being shown as in the form of an angle iron.

In reconstructing old cars the ordinary wooden door posts and a portion of the siding at one side of the door may be removed and the members A to $A^3$ secured in place upon the members B and $B^1$. If the car is sheathed on the inside, a portion of the sheathing at the rear edge of the door opening is also removed.

The door post $A^1$ is stiffened by means of a second vertical angle iron $A^4$ secured to the inner side thereof and at some distance from the edge of the door opening, thus providing an abutment against which the edge of the door may bear when the door is closed and also providing a shoulder on the inside of the door post against which the face of the door may rest.

Directly in rear of the door post A we have arranged an upright member $A^5$, preferably, though not necessarily, T-shaped in cross section. The member $A^5$ is spaced apart from the door post sufficiently to permit the door to slide between them.

Secured to the rear face of the post $A^2$ is an upright member $A^6$ preferably Z-shaped in cross section.

C represents sheathing extending between the members $A^5$ and $A^6$ and reaching from the floor of the car to the roof. It will be seen that the members $A^5$ and $A^6$ together with the sheathing form a housing into which the car door may slide without interference on the part of the contents of the car.

If desired, the car siding may be replaced between the posts A and $A^2$, although this is not necessary if the sheathing is made sufficiently tight and durable.

The door which we desire to use is of peculiar construction and is shown most clearly in Figs. 2 and 3. Referring to these figures, it will be seen that the door is made up of a frame comprising side angle irons D and $D^1$, a top angle iron $D^2$, and a bottom member $D^3$ which is preferably Z-shaped in cross section. E is a plate of iron or steel secured to the angle irons D and $D^1$ and extending from the bottom of these angle irons more than half way toward the top, leaving an open space in the upper portion of the frame. F, $F^1$, and $F^2$ are transverse stiffening pieces extending transversely of the plate and riveted thereto and to the side angle irons. G is a sheet metal plate which fits the opening in the upper portion of the frame and overlaps both of the side angle irons. At its lower end the member G is provided with a downwardly-projecting offset portion $G^2$ which overlaps the upper edge of the plate E and makes a tight joint when the plates E and G lie in the same plane. The member G is intended to form an auxiliary door which may be opened independently of the main door and to this end it is supported by means of hinges, H, $H^1$, and $H^2$, one-half of each of which is secured thereto and the other half to the angle iron $D^2$. The portions of the hinges which are secured to the auxiliary door are preferably in the form of elongated straps, $h$, $h^1$, and $h^2$ which extend from the top to the bottom of the auxiliary door and serve as braces. The parts are so arranged that when the auxiliary door is closed it forms a continuation of the plate E and, when it is opened, it swings into the interior of the car. The edge of the auxiliary door may come into close proximity to the flange $d^1$ on the angle iron $D^1$ but, as will hereinafter appear, it is necessary to provide a clearance between the flange $d$ of the angle iron D and the other edge of the auxiliary door, this latter edge terminating with the strap or hinge member $h^2$. In one of the upper corners of the auxiliary door we cut an opening $G^1$ which will give access to the interior of the car without opening either the main door or the main auxiliary door. I is a plate which is so shaped that it will just fit into the opening $G^1$. This plate is supported from the hinges $H^1$ and $H^2$ which are suitably constructed for this purpose. The hinge straps $h^3$ and $h^4$ which are secured to the auxiliary door I extend beyond the side edges thereof as indicated in Figs. 1 and 7, so as to form abutments to limit the angular movement of the door I in the outward direction. A third strap $h^5$ is secured along the lower edge of the door I so as to project slightly below it. It will be seen that the straps $h^3$ and $h^5$ not only serve as abutments to limit the swinging movement of the door, but they also serve to seal the joint about the side and bottom edges thereof. It is also desirable to have an auxiliary door near the floor of the car and to this end we cut an opening $E^1$ in the plate E beneath the transverse brace $F^2$. A frame is formed about this opening by means of an angle iron K secured to the underside of the member $F^2$, a Z-shaped member $K^1$ secured to the lower frame member $D^3$ (which overlies and is secured to the plate E) and two Z-shaped members $K^2$ and $K^3$, these latter members extending longitudinally of the door and overlapping the ends of the members K and $K^1$. L is an auxiliary door which lies on the inside of the plate E and bears against the vertical flanges of the members K and $K^1$. The length of this auxiliary door is such that it overlaps the horizontal flanges of the members $K^2$ and $K^3$. $L^1$ is a plate secured to the door L and shaped so as to fit between and lie in the same plane as the inner flanges of the members K and $K^1$. The plate $L^1$ is, therefore, of less width than the door, measured in the vertical direction, but it extends entirely from one end of the door to the other: consequently the space between the flanges $k^2$ and $k^3$ and the auxiliary door is filled by the plate $L^1$ and an exceedingly tight joint is obtained. The door L may conveniently be supported in place by means of a rod $l$ which passes through a tubular portion $l^1$ formed at the upper edge of the door by bending the plate of which the door is constructed, the ends of this rod passing through the members $K^2$ and $K^3$. It will thus be seen that the auxiliary door L is hinged so as to swing outwardly. In order to prevent this auxiliary door from swinging outwardly accidentally, a dog M may be pivoted on the outside thereof near the lower edge in position to drop between the member $K^1$ and the plate E when free to do so. It will be seen that the hinge of the auxiliary door lies above the upper edge of the opening $E^1$ and consequently a rigid support is provided for the upper edge of the auxiliary door so that even if the hinge shown should become loose, the door could not be opened under a pressure from the inside of the car.

The door may conveniently be supported upon hangers of any suitable type and carrying rollers which run upon a trackway suitably supported on the inside of the roof-supporting member $B^1$. A suitable arrangement is indicated most clearly in Fig. 8, N representing an angle iron secured on the inside of the angle iron $B^1$ and having a horizontal flange $n$ which may serve as a track. O is a hanger carrying a roller $o$ which rides upon the flange $n$, this hanger being secured in any suitable way to the top angle iron $D^2$ of the door. As many of these hangers as desired may be employed. In order to keep the rollers upon the track a plate P may be secured in any suitable way immediately adjacent to the inner edge of the angle iron $B^1$ and consequently in close proximity to the inner faces of the hangers. This may conveniently be accomplished by securing the plate at its ends to the upright members $A^4$ and $A^5$, respectively, as indicated in Fig. 4. When the door is slid back into the housing displacement of the rollers from the track is prevented by means of the sheathing.

The bottom edge of the door may be guided in any suitable way as, for example, by providing it with a groove which receives a cleat or rib secured to the floor of the car. In the arrangement shown, the groove is formed by means of the frame member $D^3$ at the bottom of the door, the peculiar shape of this member providing a groove between the inner face of the plate E and the downwardly-depending flange $d^3$. Secured to the floor of the car is a member R which extends through the housing and across the door opening. This member is provided with an upwardly-projecting flange $r$ which is received in the groove in the bottom of the door, serving not only to keep the door and hold it in proper alinement, but also to make a tight joint through which grain or the like cannot pass. In Fig. 5 the door is shown in its closed position and it will be seen that the flange $d$ of the angle iron D, forming one side of the door frame, overlaps a portion of the post $A^5$ and thus serves to close the housing at this end against the entrance of grain. In order to seal the housing at the bottom of the door we prefer to make the member R at this point equal in width to the space between the posts A and $A^5$, while that portion thereof within the housing is much narrower. The lower end of the angle iron D is so shaped that it abuts against the end of the wide portion of the cleat R and, therefore, in order that grain may enter the housing, it must pass downwardly between the end and the side of the angle iron and then beneath the angle iron. This feature is more fully illustrated in Figs. 9 to 11, Fig. 9 showing the angle iron $D^1$ which is cut off so as to ride over the wide portion of the cleat. In Fig. 11 it will be seen that the flange $d$ abuts against the end of the enlarged portion of the cleat, the only direct passage through this angle iron into the housing being around the raised rib or lip $r$; and, because this lip or rib is surrounded on three sides by the plate E and the member $D^3$, it will be very difficult for grain or the like to force a passage into the housing.

It is desirable to provide means for locking the main door in its closed position and also the auxiliary doors against movement relative to the main door in such a manner that only a single lock or seal need be used. In Figs. 1 and 12 to 14 we have shown such a locking arrangement. Journaled in bearings in the posts A and $A^1$ is a shaft S extending entirely across the door opening at a point below the floor of the car. The shaft S is provided with a pair of radially-extending arms $s$ which are adapted to engage with the outside of the door L in one position of the shaft and hold the door L against outward movement. The shaft may be provided with a third arm $s^1$ which engages with the plate E of the door at a point adjacent to the door post $A^1$ at the same time that the arms $s$ engage with the door L. If it is attempted to slide the main door open when the arm $s^1$ is in the position described, the edge of the flange $d^5$ of the angle iron $D^1$ will strike against the side of this arm and prevent the door from being opened. At the end of the shaft adjacent to the post $A^1$ is a radially-projecting arm $S^1$ which is adapted to be engaged by a gravity dog T pivoted on the post and to be held thereby in the latter position. The dog T may be locked by an auxiliary dog $t$ which hangs above it. The auxiliary dog is not absolutely essential, however. Near the lower rear corner of the auxiliary door I is pivoted a swinging catch U which, when in the position shown in Fig. 12, overlaps the surrounding portion of the main auxiliary door and prevents the door I from swinging inwardly. A similar catch V is mounted upon the lower end of the main auxiliary door G in position to overlap the plate E when the parts are adjusted as shown in Fig. 12, and prevent this door from swinging inwardly. Stops $u$, $u^1$, and $v$, $v^1$ are provided for limiting the movement of the catches U and V so that they will either lie in the locking position or in the unlocking position and will remain in any position into which they are moved. It will be seen that if means are provided for locking the catches U and V in the positions indicated in Fig. 12, it will be impossible to open the auxiliary door until these catches are released. To this end we have mounted upon the post A a vertically-slidable and revoluble shaft or rod W which is provided with arms $w$ and $w^1$ which are adapted to engage with the catches in one position of the rod or shaft and lock the catches against movement. The catch U is provided with a shoulder $u^2$ which faces upwardly when the catch is in locking position, and the catch V is provided with a similar shoulder $v^2$. The members $w$ and $w^1$ are provided with recesses $w^2$ and $w^3$, respectively, in which the shoulders $u^2$ and $v^2$ are received. Furthermore, these recesses permit the members $w$ and $w^1$ to overlie the sides of the catches. It will be seen that when the parts are held in the position shown in Fig. 12 it is not only impossible to open the doors I and G but, it is also impossible to slide the main door in the direction to uncover the door opening since the catches abut against the ends of the members $w$ and $w^1$ which form rigid stops. At the lower end of the shaft or rod W is an elongated loop X. When the shaft is in locking position, the loop lies in a plane at right angles to the side of the car and its lower end extends slightly below the jaws $y$ and $y^1$ of a bracket Y, the body of the loop lying between these jaws. Z is a pin which passes through an opening $a$ in one flange of the post A, through an opening $t^1$ in the dog T, through the loop X and beneath the jaws $y$ and $y^1$. It is now impossible to lift the shaft or rod W or to rotate the same and it is likewise impossible to lift the dog T so as to release the shaft S. The pin Z may be held against displacement in any suitable manner as, for example, by means of a seal J which passes through an opening $y^2$ in the jaw $y^1$ and through an opening $z$ in the end of the locking pin. If the locking pin should become lost it will be seen that the seal could be threaded through the jaw $y^1$, through the loop, through the dog T, and through the post so that it would be impossible to unlock the doors without breaking the seal. When it is desired to release the auxiliary doors G and I, the locking pin Z is removed and the shaft W is raised so that the catches U and V can be thrown back. These auxiliary doors can now be actuated but the main door and the lower auxiliary door will still be locked by the shaft S. If it is desired to open the main door the dog T must also be lifted so as to permit the shaft S to be swung into its inoperative position. In this case, also, the shaft W should not only be raised but it should also be rotated as indicated in Fig. 14 so as to permit the lower be swung into its inoperative position. In this position of the parts there is no danger that any portion of the doors will catch on the members $w$ and $w^1$.

It will now be seen that the auxiliary doors may be actuated independently of the main door and while the main door is locked so that access may be had to the car without danger of causing the main door to open in case the car should be moved about after the auxiliary doors are unlocked.

By examining Fig. 5 it will be seen that the auxiliary door G must clear the post $A^5$ if it is desired to open this door while the main door is closed. Consequently it is necessary to provide a clearance between the rear edge of the auxiliary door and the flange of the angle iron which engages with the post $A^5$ since otherwise the post would lock the door in its closed position.

While we have illustrated and described in detail and with particularity only a single preferred form of our invention, we do not desire to be limited to the particular construction and arrangement of parts so illustrated and described, but desire to cover all modifications which fall within the terms employed in the definitions of our invention constituting the appended claims.

What we claim is:

1. In combination, a car having the usual side door opening, a main door, means for mounting the door on the car so as to be movable into a position wherein it completely closes the door opening and into a position wherein it leaves the door opening uncovered, a portion of the door extending substantially across the entire width thereof near the top of the door being made movable with respect to the remainder of the door so as to provide an auxiliary door opening, said portion of the door being mounted on and supported by the door itself said movable portion of the door having an opening therethrough, and an auxiliary door for closing the latter opening.

2. In combination, a car having the usual side door opening, a main door, means for slidably mounting the door on the car so as to be movable into a position wherein it completely closes the said opening and a position wherein it leaves the opening uncovered, the upper portion of the door being made movable relative to the remainder of the door and hinged thereto at the top so as to swing inwardly said upper portion of the door having an opening therethrough near the top, and an auxiliary door hinged to the main door above said latter opening in position to close it.

3. In combination, a car having the usual side door opening, a main door arranged on the inside of the car, means for slidably mounting the door so as to be movable into a position wherein it completely closes said door opening and into a position wherein it leaves the opening uncovered, a housing arranged at one side of the door opening within the car, said housing being sufficiently large to receive the door when it is moved so as to uncover the door opening said main door having an auxiliary door movably mounted thereon near the upper end.

4. A car door comprising an open rectangular frame, a metal sheet secured to said frame, said sheet being of such size and shape as to close the opening in the frame except at one end thereof, an auxiliary door fitting in that portion of the opening left uncovered by said sheet, hinges joining said auxiliary door to the frame and a portion of the auxiliary door adjacent to the free edge being offset so as to overlap said sheet while the remainder of the auxiliary door lies in the plane of said sheet.

5. In a car door, an open rectangular frame formed of angle iron, a metal sheet secured to said frame, said sheet being as wide as the frame but shorter so as to leave an opening at one end of the frame, an auxiliary sheet lying in said opening, hinges connecting said auxiliary sheet to said frame, and one of said sheets being offset adjacent to the meeting edges so as to permit it to overlap the other while both sheets lie in the same plane.

6. In combination, a car having the usual side door opening, a rigid combined car and grain door of a size completely to close said opening and overlap the door frame on all sides of said opening, means for slidably mounting said door on the inner side of said frame, a housing for the door arranged at one side of the door opening and being of a size to receive the entire door when it is moved laterally to uncover the opening, said door having auxiliary doors in the top and in the bottom thereof, a locking bar arranged upon the exterior of the car below the door opening, a second locking bar, means associated with said bars for locking the main door and the auxiliary door, and a locking device common to both of said bars for locking them against movement.

7. A car door comprising an open rectangular frame, a metal sheet secured to said frame so as to close the opening therein, said sheet having a portion removed at the top to provide an auxiliary door opening, an auxiliary door fitting in said opening, said auxiliary door having an opening therein, a second auxiliary door shaped to close the latter opening, and a common hinge connecting said auxiliary doors to said frame.

In testimony whereof, we sign this specification in the presence of two witnesses.

ROBERT C. JOHNSON.
DUNCAN S. McEWING.

Witnesses:
WM. F. FREUDENREICH,
AUGUST MISICKA.